(12) United States Patent
Jones et al.

(10) Patent No.: US 7,473,663 B2
(45) Date of Patent: Jan. 6, 2009

(54) PROCESS FOR THE PREPARATION OF AN ADDITIVE-CONTAINING ANIONIC CLAY

(75) Inventors: William Jones, Cambridge (GB); Dennis Stamires, Newport Beach, CA (US); Paul O'Connor, Hoevelaken (NL); Michael F. Brady, Studio City, CA (US)

(73) Assignee: Albemarle Netherlands B.V., Amersfoort (NL)

( * ) Notice: Subject to any disclaimer, the term of this patent is extended or adjusted under 35 U.S.C. 154(b) by 24 days.

(21) Appl. No.: 11/587,393

(22) PCT Filed: Apr. 26, 2005

(86) PCT No.: PCT/EP2005/004557

§ 371 (c)(1),
(2), (4) Date: Jul. 2, 2007

(87) PCT Pub. No.: WO2005/102930

PCT Pub. Date: Nov. 3, 2005

(65) Prior Publication Data

US 2008/0032883 A1   Feb. 7, 2008

(30) Foreign Application Priority Data

Jul. 12, 2004   (EP) .................... 04077019

(51) Int. Cl.
*B01J 20/06* (2006.01)
*B01J 20/08* (2006.01)
*B01J 23/00* (2006.01)
*B01J 21/02* (2006.01)

(52) U.S. Cl. .............. 502/80; 502/84; 502/85; 502/400; 502/407; 502/411; 502/414; 502/415; 502/417

(58) Field of Classification Search ............ 502/80, 502/84, 85, 400, 407, 411, 414, 415, 517
See application file for complete search history.

(56) References Cited

U.S. PATENT DOCUMENTS

| 6,028,023 | A | 2/2000 | Vierheilig |
| 7,160,830 | B2 * | 1/2007 | Van Der Zon et al. ........... 502/8 |
| 2004/0117949 | A1 * | 6/2004 | Zon et al. ................. 23/313 R |

FOREIGN PATENT DOCUMENTS

| DE | 102 17 364 A1 | 10/2003 |
| EP | 0 421 678 A1 | 4/1991 |

* cited by examiner

*Primary Examiner*—Elizabeth D Wood
(74) *Attorney, Agent, or Firm*—Jeremy J. Kliebert

(57) ABSTRACT

Process for the preparation of an additive-containing anionic clay comprising the steps of (a) preparing a physical mixture of a divalent and a trivalent metal compound, (b) calcining the physical mixture at a temperature in the range 200-800° C. without performing a prior aging or shaping step, thereby forming a product containing at least 5 wt % of a rehydratable compound, and (c) rehydrating the calcined mixture in aqueous suspension containing an additive to form the additive-containing anionic clay.

This process provides a simple and cost-effective way of preparing additive-containing anionic clays. The process does neither require aging or reaction steps before calcination, nor does it require precipitation of metal salts or the handling of inhomogeneous slurries.

9 Claims, No Drawings

PROCESS FOR THE PREPARATION OF AN ADDITIVE-CONTAINING ANIONIC CLAY

The present invention relates to the preparation of an additive-containing anionic clay.

Anionic clays have a crystal structure consisting of positively charged layers built up of specific combinations of divalent and trivalent metal hydroxides between which there are anions and water molecules. Hydrotalcite is an example of a naturally occurring anionic clay wherein Mg is the divalent metal, Al is the trivalent metal, and carbonate is the predominant anion present. Meixnerite is an anionic clay wherein Mg is the divalent metal, Al is the trivalent metal, and hydroxyl is the predominant anion present.

A variety of terms is used to describe the material that is referred to in this specification as an anionic clay, such as hydrotalcite-like material and layered double hydroxide. In this specification we refer to these materials as anionic clays, comprising within that term hydrotalcite-like materials and layered double hydroxides.

It is known to add additives, e.g. transition metals, rare earth metals, etc., to anionic clays in order to improve their ability for special applications. For instance, Ce and/or V are known to improve the ability of anionic clays to remove SOx and/or NOx compounds in FCC. The presence of V and Zn is known to improve the suitability of anionic clays for removal of S-compounds in the gasoline and diesel fraction of FCC.

The preparation of additive-containing anionic clays is described in EP 0 278 535. This method involves co-precipitation of a divalent metal salt, a trivalent metal salt, and a rare earth metal salt out of an aqueous solution, followed by aging, filtering, washing, and drying of the precipitate.

Another method disclosed by this document is impregnation of an anionic clay with the desired additive.

WO 02/068329 discloses the preparation of anionic clays from water-insoluble metal compounds like gibbsite and MgO. A slurry comprising these metal compounds is milled and aged to form an anionic clay. This anionic clay is optionally calcined to form a solid solution and then hydrated in a suspension to form an anionic clay again. Additives are optionally added to the aging suspension.

U.S. Pat. No. 6,028,023 describes the preparation of RE-containing anionic clays by reacting a slurry comprising a divalent metal compound and a trivalent metal compound under conditions such that the product obtained is not an anionic clay, heat-treating the resulting product, and hydrating the heat-treated product to form an anionic clay compound. Metallic oxidants, e.g. cerium or vanadium, can be present in the reaction mixture.

The object of the present invention is to provide a process for the preparation of an additive-containing anionic clay which is simpler and more cost-effective than the prior art processes mentioned above.

In particular, it is an object to provide a process which does not require aging or reaction steps before calcination.

It is a further object to provide a process that does not require precipitation of metal salts, as precipitation processes are industrially troublesome. Further, it is an object to provide a process which does not involve handling of slurries in which divalent and trivalent metal compounds are reacting. The viscosity in such slurries is constantly changing, leading to inhomogeneous slurries. The handling of such inhomogeneous slurries often results in pumping problems and clogging.

The process according to the present invention comprises the steps of:
a. preparing a physical mixture by mixing a dry divalent metal compound with a dry trivalent metal compound, said physical mixture being solid at room temperature,
b. calcining the physical mixture at a temperature in the range 200-800° C. without performing a prior aging or shaping step, thereby forming a product containing at least 5 wt % of a hydratable compound, and
c. hydrating the calcined mixture in an aqueous suspension containing an additive to form the additive-containing anionic clay.

Step a)

The first step of the process involves the preparation of a physical mixture by mixing a dry divalent metal compound with a dry trivalent metal compound. A 'dry metal compound' is regarded as a metal compound in the form of solid particulates, which particulates are not suspended in a liquid. However, this dry metal compound may contain crystal water.

Suitable trivalent metals include aluminium, gallium, indium, iron, chromium, vanadium, cobalt, manganese, cerium, niobium, nickel, lanthanum, and combinations thereof.

Aluminium compounds include aluminium alkoxide, aluminium oxides and hydroxides such as transition alumina, aluminium trihydrate (gibbsite, bayerite) and its thermally treated forms (including flash-calcined alumina), alumina sols, amorphous alumina, (pseudo)boehmite, aluminium-containing clays such as kaolin, sepiolite, and modified clays such as metakaolin or acid-treated bentonite, alumina salts such as aluminium nitrate, aluminium chloride, aluminium chlorohydrate, sodium aluminate, and aluminium sulphate. With the preparation method according to the invention it is also possible to use coarser grades of aluminium trihydrate such as BOC (Bauxite Ore Concentrate) or bauxite.

Suitable gallium, indium, iron, chromium, vanadium, cobalt, cerium, niobium, lanthanum and manganese compounds are the respective oxides, hydroxides, carbonates, bicarbonates, hydroxycarbonates, nitrates, chlorides, chlorohydrates, acetates, hydroxyacetates, and alkoxides.

Preferred trivalent metal compounds are oxides, hydroxides, carbonates, bicarbonates, and hydroxycarbonates, and (hydroxy)acetates, as these materials are relatively inexpensive. Moreover, these materials do not leave undesirable anions in the additive-containing anionic clay which either have to be washed out or will be emitted as environmentally harmful gases upon heating.

Also mixtures of the above-mentioned trivalent metal compounds can be used, or doped trivalent metal compounds. Such doped metal compounds are prepared by treatment of a trivalent metal compound in the presence of a dopant. Examples of doped trivalent metal compounds are doped quasi-crystalline boehmite according to WO 01/12551 and WO 01/12553 and doped micro-crystalline boehmite according to WO 01/12552.

Suitable divalent metals include magnesium, zinc, nickel, copper, iron, cobalt, manganese, calcium, barium, strontium, and combinations thereof.

Suitable magnesium compounds are oxides or hydroxides such as MgO and $Mg(OH)_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, magnesium chloride, magnesium-containing clays such as dolomite, saponite, and sepiolite. Suitable zinc, nickel, copper, iron, cobalt, manganese, calcium, and barium compounds are the respective oxides, hydroxides, carbonates, hydroxycarbonates, bicarbonates, nitrates, chlorides, acetates, and hydroxyacetates.

Preferred divalent metal compounds are oxides, hydroxides, carbonates, hydroxycarbonates, bicarbonates, and (hydroxy)acetates, as these materials are relatively inexpensive. Moreover, these materials do not leave undesirable anions in the additive-containing anionic clay which either have to be washed out or will be emitted as environmentally harmful gases upon heating.

Also mixtures of the above-mentioned divalent metal compounds can be used, or doped divalent metal compounds. Such doped metal compounds are prepared by treatment of a divalent metal compound with a suitable dopant. An example of a doped divalent metal compound is doped brucite.

The physical mixture is solid at room temperature. This means that the physical mixture is sufficiently dry to be calcined.

In order to prepare the physical mixture, the divalent and trivalent metal compounds are mixed as dry powders.

The molar ratio of divalent to trivalent metal in the physical mixture preferably ranges from 0.1 to 10 more preferably from 0.1 to 5, and most preferably from 1 to 3.

Before calcination, the physical mixture is neither aged, nor shaped. However, the physical mixture may be milled before calcination. Alternatively, or in addition to milling of the physical mixture, the divalent and trivalent metal compounds can be milled individually before forming the physical mixture.

Step b)

The physical mixture is calcined at a temperature in the range of 200-800° C., more preferably 300-700° C., and most preferably 350-600° C., thereby forming a product containing at least 5 wt % (based on total weight of the composition) of a hydratable compound, i.e. a mixed metal oxide which can be hydrated in polar liquids to form an anionic clay.

The amount of hydratable oxide formed in step b) is equivalent to and calculated from the amount of anionic clay obtained in step c). This amount can be determined by mixing various known amounts of pure anionic clay with samples of the hydrated product of step c). Extrapolation of the relative intensities of anionic clay to non-anionic clay in these mixed samples—as measured with Powder X-Ray Diffraction (PXRD)—can then be used to determine the amount of anionic clay in the hydrated product.

An example of a non-hydratable oxide is a spinel phase.

An example of such a hydratable compound is a so-called solid solution. Spinel, for example, is not regarded as hydratable.

Calcination is conducted for 0.25-25 hours, preferably 1-8 hours, and most preferably 2-6 hours. All commercial types of calciners can be used, such as fixed bed or rotating calciners.

Calcination can be performed in various atmospheres, e.g., in air, oxygen, inert atmosphere (e.g. $N_2$), steam, or mixtures thereof.

It is possible to add an additive to the physical mixture and/or mill the physical mixture during calcination, provided that the calciner has sufficient mixing capability and can be effectively used as mixer as well as calciner.

Step C)

Hydration of the calcined material is conducted by contacting the calcined mixture with water and the desired additive, preferably by using an aqueous solution of the additive. Hydration can be done by passing the calcined mixture over a filter bed with sufficient liquid spray, or by suspending the calcined mixture in the liquid.

The temperature of the suspension during hydration is preferably between 25 and 350° C., preferably between 25 and 200° C., more preferably between 50 and 150° C., the temperature of choice depending on the nature of the anionic clay and the type and amount of metal compound. Hydration is performed for about 20 minutes to 20 hours, preferably 30 minutes to 8 hours, more preferably 1-4 hours.

During hydration the suspension can be milled by using high-shear mixers, colloid mixers, ball milles, kneaders, electrical transducers that can introduce ultrasound waves into a suspension, etc.

Hydration can be performed batch-wise or continuously, optionally in a continuous multi-step operation according to pre-published U.S. patent application no. 2003-0003035. For example, the hydration suspension is prepared in a feed preparation vessel, whereafter the suspension is continuously pumped through two or more conversion vessels. The additive(s) and optionally acids or bases can be added to the suspension in any of the conversion vessels. Each of the vessels can be adjusted to its own desirable temperature.

During hydration the viscosity of the suspensions used will generally not change to a large extent. Hence, the problems associated with large viscosity changes (pumping problems and clogging) are generally not encountered in this step.

Suitable additives to be present during hydration are compounds comprising an element selected from the group of alkali metals (Na, K), alkaline earth metals (for instance Mg, Ca and Ba), Group IIIA transition metals, group IVA transition metals (e.g. Ti, Zr), Group VA transition metals (e.g. V, Nb), Group VIA transition metals (e.g. Cr, Mo, W), Group VIIA transition metals (e.g. Mn), Group VIIIA transition metals (e.g. Fe, Co, Ni, Ru, Rh, Pd, Pt), Group IB transition metals (e.g. Cu), Group IIB transition metals (e.g. Zn), Group IIIB elements (e.g. B, Al, Ga), Group IVB elements (e.g. Si, Sn), Group VB elements (e.g. P), lanthanides (e.g. La, Ce), and mixtures thereof, provided that the element differs from the metals constituting the divalent and the trivalent metal compound of step a).

Suitable compounds of these elements are their salts, oxides, hydroxides, carbonates, and hydroxycarbonates.

Preferred elements are La, Ce, V, W, Mo, P, Pt, Pd, and Nb.

Various anions can be present during hydration, either as part of the additive (if the additive is a salt), or as additional compound. Examples of such anions include inorganic anions like $NO_3^-$, $NO_2^-$, $CO_3^{2-}$, $HCO_3^-$, $SO_4^{2-}$, $SO_3NH_2^{2-}$, $SCN^-$, $S_2O_6^{2-}$, $SeO_4^-$, $F^-$, $Cl^-$, $Br^-$, $I^-$, $ClO_3^-$, $ClO_4^-$, $BrO_3^-$, $IO_3^-$, silicate, aluminate, and metasilicate, organic anions like acetate, oxalate, formate, long chain carboxylates (e.g. sebacate, caprate and caprylate (CPL)), alkylsufates (e.g. dodecylsulfate (DS) and dodecylbenzenesulfate), stearate, benzoate, phthalocyanine tetrasulfonate, and polymeric anions such as polystyrene sulfonate, polyimides, vinylbenzoates, and vinyidiacrylates, and pH-dependent boron-containing anions, bismuth-containing anions, thallium-containing anions, phosphorus-containing anions, silicon-containing anions, chromium-containing anions, vanadium-containing anions, tungsten-containing anions, molybdenum-containing anions, iron-containing anions, niobium-containing anions, tantalum-containing anions, manganese-containing anions, aluminium-containing anions, and gallium-containing anions.

If so desired, the additive-containing anionic clay can be mixed with conventional catalyst or sorbent ingredients such as silica, alumina, aluminosilicates, zirconia, titania, boria, (modified) clays such as kaolin, acid leached kaolin, dealuminated kaolin, smectites, and bentonite, (modified or doped) aluminium phosphates, zeolites (e.g. zeolite X, Y, REY, USY, RE-USY, or ZSM-5, zeolite beta, silicalites), phosphates (e.g. meta or pyro phosphates), pore regulating agents (e.g. sugars, surfactants, polymers), binders, fillers, and combinations thereof.

The so-obtained additive-containing anionic clay, optionally mixed with one or more of the above conventional catalyst components, can be shaped to form shaped bodies. Suitable shaping methods include spray-drying, pelletising, extrusion (optionally combined with kneading), beading, or any other conventional shaping method used in the catalyst and absorbent fields or combinations thereof.

The resulting additive-containing anionic clay, either before or after the optionally shaping step, can be subjected to an additional calcination and optionally an additional hydration step.

The so-formed calcined material can be used as a catalyst or sorbent for various purposes, such as FCC processes. If this calcination is followed by a subsequent hydration, an additive-containing anionic clay is formed analogous to the one formed after the first hydration step, but with an increased mechanical strength.

These second calcinations and hydration steps may be conducted under conditions which are either the same or different from the first calcination and hydration steps.

Additional metal compounds may be added during this additional calcination step and/or during this hydration step. These additional metal compounds and the additive present in step c) are independently selected from the same group of compounds, i.e. compounds comprising an element selected from the group of alkaline earth metals (for instance Mg, Ca and Ba), Group IIIA transition metals, group IVA transition metals (e.g. Ti, Zr), Group VA transition metals (e.g. V, Nb), Group VIA transition metals (e.g. Cr, Mo, W), Group VIIA transition metals (e.g. Mn), Group VIIIA transition metals (e.g. Fe, Co, Ni, Ru, Rh, Pd, Pt), Group IB transition metals (e.g. Cu), Group IIB transition metals (e.g. Zn), Group IIIB elements (e.g. B, Al, Ga), Group IVB elements (e.g. Si, Sn), Group VB elements (e.g. P), lanthanides (e.g. La, Ce), and mixtures thereof. However, these elements differ from the metals constituting the divalent and the trivalent metal compounds of step a).

Furthermore, during this additional hydration step, anions can be added. Suitable anions are the ones mentioned above in relation to the first hydration step. The anions added during the first and the additional hydration step can be the same or different.

Use of the Additive-Containing Anionic Clay

Additive-containing anionic clays (e.g. Ce and/or V-containing anionic clays) are known to be very suitable as sulfur oxide sorbent material. Hence, the additive-containing anionic clay prepared according to the present invention can be incorporated for this purpose in FCC catalysts or FCC catalyst additives. Additionally, the additive-containing anionic clay can be used for the adsorption of sulfur oxide emission from other sources, like power plants.

Because sulfur oxide sorbent materials are generally good nitrogen oxide sorbent materials, the additive-containing anionic clay will likewise be suitable as nitrogen oxide sorbent material in, e.g., FCC catalysts, FCC catalyst additives, etc.

Furthermore, the additive-containing anionic clay can be used for other purposes, such as removing gases like HCN, ammonia, $Cl_2$, and HCl from steel mills, power plants, and cement plants, for reduction of the sulphur and/or nitrogen content in fuels like gasoline and diesel, as additives for the conversion of CO to $CO_2$, and in or as catalyst compositions for Fischer-Tropsch synthesis, hydroprocessing (hydrodesulfurisation, hydrodenitrogenation, demetallisation), hydrocracking, hydrogenation, dehydrogenation, alkylation, isomerisation, Friedel Crafts processes, ammonia synthesis, etc.

For use in SOx and/or NOx removal, Ce, V, Cu, La, Fe, and W are desired additives. For the removal of S-compounds in the gasoline and diesel fraction of FCC V, Zn, Mo, and W are desired additives.

Desired additives for use in hydroprocessing are Co, Mo, W, and Ni, whereas Fe and Co are desired additives for use of the additive-containing anionic clay in Fischer-Tropsch processes.

The additive-containing anionic clay can be treated with organic agents, thereby making the surface of the material—which is generally hydrophilic in nature—more hydrophobic. This allows for the additive-containing anionic clay to disperse more easily in organic media.

When applied as nanocomposites (i.e. particles with a diameter less then about 500 nm), the additive-containing anionic clay can suitably be used in plastics, resins, rubber, and polymers. Nanocomposites with a hydrophobic surface, for instance obtained by treatment with an organic agent, are especially suited for this purpose.

The additive-containing anionic clay may also be pillared, delaminated and/or exfoliated using known procedures.

EXAMPLES

Example 1

A physical powder mixture was prepared by dry milling 11.47 g gibbsite, 14.82 g magnesium oxide and 17.14 g lanthanum carbonate for 15 minutes in an analytical grinding mill. This mixture was calcined for four hours at 500° C. The calcined product was then hydrated overnight at 85° C. in 650 g of a 1 M sodium carbonate solution. The product was then filtered, washed with distilled water, and dried at 110° C.

PXRD showed the formation of an anionic clay.

Example 2

A physical powder mixture was prepared by dry milling 11.47 g gibbsite, 17.79 g magnesium oxide and 6.62 g cerium carbonate for 15 minutes in an analytical grinding mill. This mixture was calcined for four hours at 500° C. The calcined product was then hydrated overnight at 85° C. in a solution comprised of 1.54 g ammonium metavanadate dissolved in 260 g of distilled water. The product was then filtered, washed with distilled water, and dried at 110° C.

PXRD showed the formation of an anionic clay.

Example 3

A physical powder mixture was prepared by dry milling 11.47 g gibbsite, 17.79 g magnesium oxide for 15 minutes in an analytical grinding mill. This mixture was calcined for four hours at 500° C. The calcined product was slurried in a solution comprised of 9.17 g lanthanum nitrate dissolved in 200 g distilled water. The pH of the slurry was adjusted to 9 with dilute ammonium hydroxide and the calcined product was hydrated in the slurry 85° C., overnight. The resulting product was filtered, washed with distilled water, and dried at 110° C.

PXRD showed the formation of an anionic clay.

The invention claimed is:

1. A process for the preparation of an additive-containing anionic clay comprising the steps of:
   a) preparing a physical mixture comprising a divalent and a trivalent metal compound,
   b) calcining the physical mixture at a temperature in the range 200-800° C. without performing a prior aging or shaping step, thereby forming a product containing at least 5 wt % of a rehydratable compound, and
   c) rehydrating the calcined mixture in aqueous suspension containing an additive to form the additive-containing anionic clay.

2. The process according to claim 1 wherein the physical mixture is milled before or during calcination.

3. The process according to claim 1 wherein the calcination temperature ranges from 300 to 700° C.

4. The process according to claim 3 wherein the calcination temperature ranges from 350 to 600° C.

5. The process according to claim 1 wherein the divalent metal is selected from the group consisting of Mg, Zn, Ni, Fe, Co, Ca, Sr, Ba, Mn, Cu, and combinations thereof.

6. The process according to claim 1 wherein the trivalent metal is selected from the group consisting of Al, Ga, Fe, Cr, V, Mn, Co, Ni, and combinations thereof.

7. The process according to claim 1 wherein the additive is a compound containing an element selected from the group consisting of Ce, La, V, Cu, Zn, Ni, Fe, Co, Mo, W, P, Pt, Pd, Nb, and combinations thereof.

8. The process according to claim 1 followed by calcination of the formed additive-containing anionic clay.

9. The process according to claim 8 followed by rehydration of the calcined additive-containing anionic clay.

* * * * *